US007643740B2

(12) United States Patent
Lee

(10) Patent No.: US 7,643,740 B2
(45) Date of Patent: Jan. 5, 2010

(54) HAND-SHAKE CORRECTION MODULE FOR DIGITAL CAMERA

(75) Inventor: Kyung-bae Lee, Changwon-si (KR)

(73) Assignee: Samsung Digital Imaging Co., Ltd., Suwon-si (KR)

(*) Notice: Subject to any disclaimer, the term of this patent is extended or adjusted under 35 U.S.C. 154(b) by 358 days.

(21) Appl. No.: 11/698,563

(22) Filed: Jan. 25, 2007

(65) Prior Publication Data
US 2007/0292119 A1 Dec. 20, 2007

(30) Foreign Application Priority Data
Jun. 19, 2006 (KR) .................... 10-2006-0054889

(51) Int. Cl.
G03B 17/00 (2006.01)
H04N 5/228 (2006.01)
(52) U.S. Cl. .................... 396/55; 348/208.7
(58) Field of Classification Search .............. 396/55, 396/52; 348/208.99, 208.2, 208.7; 359/554
See application file for complete search history.

(56) References Cited
U.S. PATENT DOCUMENTS

2003/0067544 A1    4/2003  Wada
2005/0185057 A1*   8/2005  Seo .................... 348/208.4

* cited by examiner

Primary Examiner—Rochelle-Ann J Blackman
(74) Attorney, Agent, or Firm—Drinker Biddle & Reath LLP

(57) ABSTRACT

Provided is a hand-shake correction module for a digital camera, which has a small volume and small operational load when moved. The hand-shake correction module includes a base plate; a first sliding member which moves in a first axis direction with respect to the base plate; a second sliding member including an image pickup device, the second sliding member being movable with respect to the first sliding member in a second axis direction perpendicular to the first axis; and a pressing means which generates a magnetic force preventing the first sliding member and the second sliding member from being separated from the base plate.

20 Claims, 4 Drawing Sheets

HAND-SHAKE CORRECTION MODULE FOR DIGITAL CAMERA

CROSS-REFERENCE TO RELATED PATENT APPLICATION

This application claims the benefit of Korean Patent Application No. 10-2006-0054889, filed on Jun. 19, 2006, in the Korean Intellectual Property Office, the disclosure of which is incorporated herein in its entirety by reference.

BACKGROUND OF THE INVENTION

1. Field of the Invention

The present invention relates to a hand-shake correction module for a digital camera, and more particularly, to a hand-shake correction module for a digital camera, which reduces the influence of hand-shake when taking pictures.

2. Description of the Related Art

As digital still cameras and digital video cameras have become ubiquitous, consumers' demands for high quality photographs and moving images have increased. In particular, when a CMOS (complementary metal oxidized semiconductor) sensor is used as an image pickup device, instead of a CCD (charge coupled device), picture resolution is degraded due to hand-shake. To address this problem, a hand-shake correction module is being increasingly used in digital still cameras and video cameras.

Hand shake correction can be performed using lens shifting, image pickup shifting, or lens barrel shifting. Image pickup shifting is schematically illustrated in FIG. 1. Referring to FIG. 1, a conventional hand-shake correction system 1 includes a base plate 2, a slider 3, and an image pickup device base 4. The image pickup device base 4 is equipped with an image pickup device, (not illustrated), for example, a CCD.

The image pickup device base 4 is installed on the slider 3 and can move along a Y-axis direction with respect to the slider 3. The slider 3 is installed on the base plate 2 and can move along an X-axis direction with respect to the base plate 2. Therefore, the image pickup device can move along the X-axis and Y-axis directions with respect to the base plate 2. The slider 3 and the image pickup device base 4 are driven along the X-axis and Y-axis directions by separate driving means (not illustrated) such as motors, actuators or other devices known in the art. A spring 5 is installed between a protrusion 3a of the slider 3 and a protrusion 2a of the base plate 2. The spring 5 provides an elastic force that prevents the slider 3 and the image pickup device base 4 from separating from the base plate 2 in a Z-axis direction.

The base plate 2 included in the hand-shake correction system 1 of FIG. 1 may be installed in a barrel (not illustrated) of an optical system of a digital camera and thus, moves with the digital camera. When a user of the digital camera takes a picture and the hand of the user shakes in the X-axis or Y-axis directions, the image pickup device base 4 moves in an opposite direction of the hand-shake motion to compensate for the hand-shake. However, because of the spring 5, the conventional hand shake correction system has several disadvantages as explained below.

First, a driving means of the slider 3 provides a driving force F (FIG. 2) to the slider 3. Therefore, when the slider 3 moves to the right in the X-axis direction with respect to the base plate 2, the spring 5 applies an elastic force K in the opposite direction of the driving force F in the X-axis direction. Thus, when the spring 5 is short, the elastic force K is larger, and accordingly, the operation of the driving means is obstructed. Second, since the elastic force K varies with the moving distance of the slider 3, the load of the spring 5 applied to the driving means of the slider 3 also varies, and thus, it is difficult to achieve linear control of the driving means of the slider 3.

To address these problems, the length of the spring 5 should be sufficiently long. However, when the spring 5 is long the height of the hand-shake correction system 1 increases. In addition, in order to attach a long spring 5 between the protrusions 2a and 3a, the height h (FIG. 1) may become greater than the average height of the hand-shake correction system 1. To this end, the inner space for placing other elements in the hand-shake correction system may be limited.

SUMMARY OF THE INVENTION

A hand shake correction module for a camera is provided. An embodiment of the hand shake correction module includes: a base plate; a first sliding member that is movable in a first axis direction with respect to the base plate; a second sliding member including an image pickup device, the second sliding member being movable with respect to the first sliding member in a second axis direction being generally perpendicular to the first axis; and a pressing means which prevents the first sliding member and the second sliding member from being separated from the base plate.

An example pressing means may include a first magnetic or magnetizable member connected to the first sliding member; and a second magnetic or magnetizable member connected to the base plate such that a magnetic force between the first and second members presses the first sliding member to a side of the base plate in a third axis direction that is generally perpendicular to the first and second axis directions. In addition, the first and second members are configured such that they are substantially aligned with each other.

DETAILED DESCRIPTION OF THE EMBODIMENTS

Hereinafter, the present invention will be described more fully with reference to the accompanying drawings, in which exemplary embodiments of the invention are shown.

Figure 3:
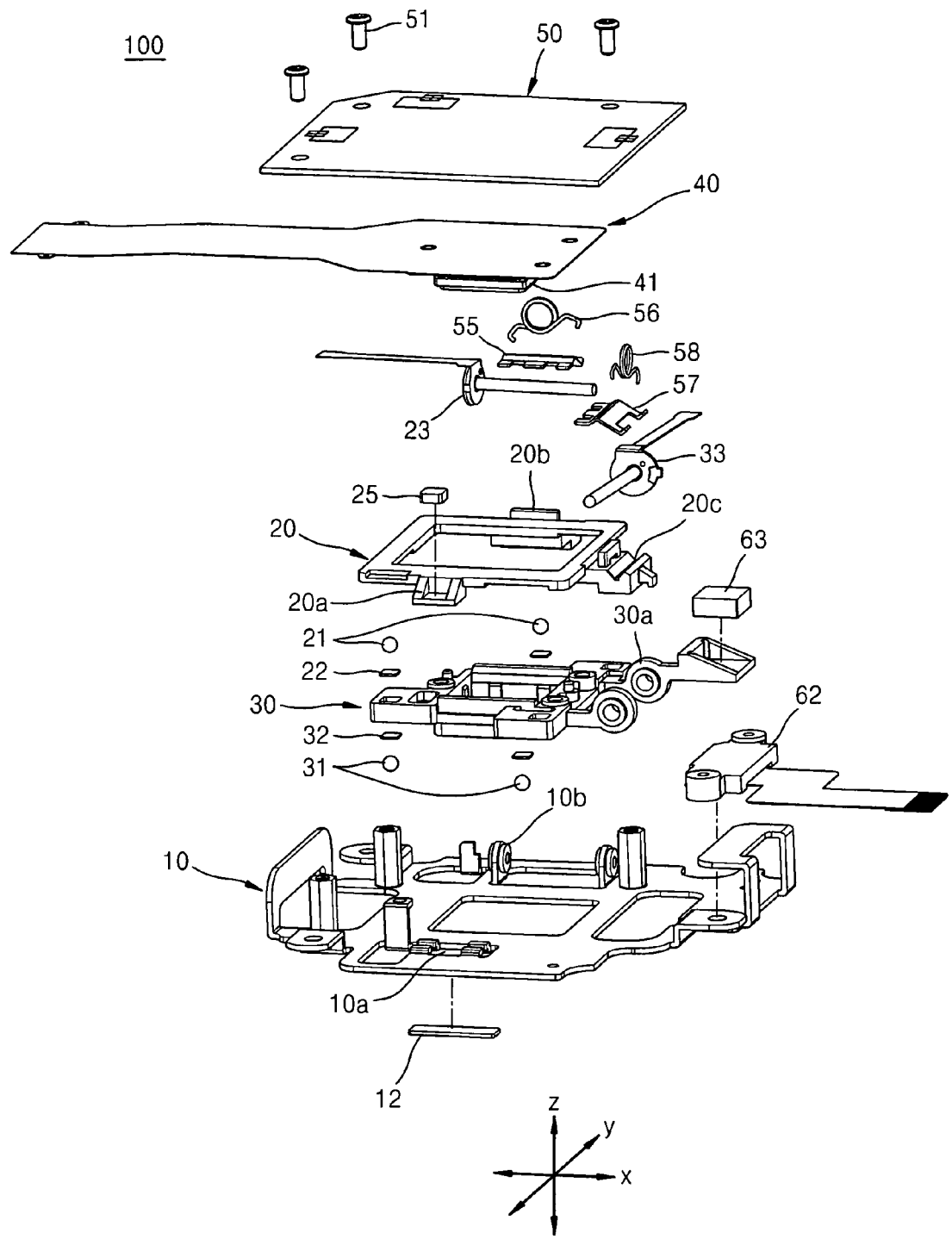
FIG. 3 is an exploded view of an example hand-shake correction module for a digital camera according to an embodiment of the present invention.
Figure 4:
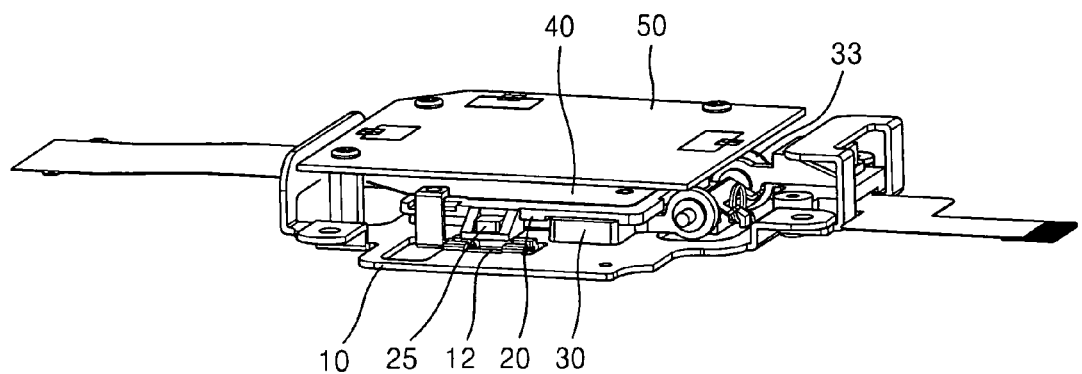
FIG. 4 is a perspective view illustrating an assembled state of the hand-shake correction module of FIG. 3.

FIG. 3 is an exploded view of an example hand-shake correction module 100 according to an embodiment of the present invention and FIG. 4 is a perspective view illustrating an assembled state of the example hand-shake correction module 100 illustrated in FIG. 3.

The hand-shake correction module 100 illustrated in FIGS. 3 and 4 includes a base plate 10, a first sliding member 20, a second sliding member 30, a first driving means 23, a second driving means 33, a pressing means and a shift sensing means 62. The base plate 10 provides support for components of the hand-shake correction module 100. The sliding member 20 is coupled to the base plate 10 and can move in a first direction (e.g., the X-axis direction) with respect to the base plate 10.

The first driving means 23 is coupled to a portion 10b of the base plate 10 to be able to move in the X-axis direction. The driving shaft of the first driving means 23 is disposed in a V-shaped groove 20b of the first sliding member 20. After the driving shaft of the first driving means 23 is disposed in the V-shaped groove 20b of the first sliding member 20, a V-shaped cover 55 is disposed on the driving shaft of the first driving means 23 and the V-shaped cover 55 is pressed to a side of the V-shaped groove 20b using a spring 56 (e.g., a torsion spring as shown).

The first driving means 23 may be, for example, a piezo-electric motor, actuator or any driving device known in the art that is capable of effecting reciprocal (i.e., back and forth) linear or rotational motion. Therefore, the first driving means 23 moves the first sliding member 20 in the X-axis direction with respect to the base plate 10.

The second sliding member 30 is coupled with the lower center of the first sliding member 20 and can move in the Y-axis direction with respect to the first sliding member 20. The second driving means 33 is coupled to a portion 30a of the second sliding member 30 to be able to move in a second direction (e.g., the Y-axis direction) that is generally perpendicular to the first direction. The driving shaft of the second driving means 33 is disposed in a V-shaped groove 20c of the first sliding member 20. After the driving shaft of the second driving means 33 is disposed into the V-shaped groove 20c of the first sliding member 20, a V-shaped cover 57 is disposed on the driving shaft of the second driving means 33 and the V-shaped cover 57 is pressed to a side of the V-shaped groove 20c using a spring 58 (e.g., a torsion spring as shown). The second driving means 33 may be, for example, for example, a piezo-electric motor, actuator or any driving device known in the art that is capable of effecting reciprocal (i.e., back and forth) linear or rotational motion. In some embodiments, the second driving means 33 may be substantially similar to the first driving means 23, but the second driving means 33 is not limited as such. The second driving means 33 moves the second sliding member 30 in the Y-axis direction with respect to the first sliding member 20.

An image pickup device 41, for example, a CCD (charge coupled device) or a CMOS (complementary metal oxidized semiconductor) sensor, is disposed on the second sliding member 30 (e.g., in the center thereof) and an IR filter (not illustrated) may be interposed between the image pickup device 41 and lenses (not illustrated).

As further shown in FIG. 3, the image pickup device 41 is coupled to an image pickup device assembly 40. In addition, a printed circuit board 50 is configured on the image pickup device assembly 40 opposite the side including the image pickup device 41. The printed circuit board 50 and the image pickup device assembly 40 may be coupled together using connecting members 51 (e.g., fasteners such as screws, bolts, etc.) as shown. Since the first sliding member 20 can move in the X-axis direction with respect to the base plate 10 and the second sliding member 30 can move in the Y-axis direction with respect to the first sliding member 20, the image pickup device 41 can move with two degrees of freedom (in the X-axis and Y-axis directions) with respect to the base plate 10.

First ball bearings 21 and first bearing plates 22 as well as second ball bearings 31 and second bearing plates 32 may be interposed between moving members of the module 100 as shown. In this way, a space between moving members can be secured and friction between the moving members can be reduced. In more detail, the first ball bearing 21 and the first bearing plate 22 are interposed between the first sliding member 20 and the second sliding member 30. Although two first ball bearings 21 and two first bearing plates 22 are shown, fewer or additional first ball bearings 21 and first bearing plates 22 may be provided. Similarly, the second ball bearing 31 and the second bearing plate 32 are interposed between the second sliding member 30 and the base plate 10. Although two second ball bearings 31 and two second bearing plates 32 are shown, fewer or additional second ball bearings 31 and second bearing plates 32 may be provided. In this way, the first sliding member 20 and the second sliding member 30 can smoothly move in the X-axis and Y-axis directions with respect to the base plate 10. As can be appreciated, the number of the ball bearings and the bearing plates can vary and other devices or parts (e.g., plastic members with inherent lubricity) may be employed to facilitate relative movement of the first sliding member 20, the second sliding member 30 and the base plate 10.

As an example of the pressing means according to an embodiment of the present invention, a first member being a magnet 25 is coupled to one side portion 20a of the first sliding member 20 and a second member being a magnetic guide plate 12 is coupled to one side portion 10a of the base plate 10. Thus, a magnetic attraction force is developed between the first and second members (i.e., the magnetic guide plate 12 and the magnet 25) of the pressing means. Accordingly, the first sliding member 20 and the second sliding member 30 cannot be easily separated from the base plate 10. Although the magnet 25 is coupled to the first sliding member 20 and the magnetic guide plate 12 is coupled to the base plate 10, it should be appreciated that the magnet 25 and magnetic guide plate 12 may be configured oppositely. Furthermore, it should be appreciated that the magnet 25 may be any one of the following magnetic members including a permanent magnet, an electromagnet and a magnetized member. Similarly, it should be appreciated that the magnetic guide plate 12 may be any member known in the art that may be attracted to or otherwise cooperate with the magnet 25 such as, for example, a permanent magnet, an electromagnet, a magnetized member and a magnetizable (e.g., ferric) member.

The one side portion 20a of the first sliding member 20 to which the magnet 25 is coupled and the one side portion 10a of the base plate 10 to which the magnetic guide plate 12 is coupled may be generally aligned with each other. Also, as can be appreciated, the magnetic guide plate 12 and the base plate 10 are made of different materials (e.g., a magnetic material and non-magnetic material or vice versa, respectively) such that the base plate 10 does not interfere with attraction between the magnet 25 and the magnetic guide plate 12. In one example, the base plate 10 may comprise a paramagnetic material such as aluminum.

As shown in FIG. 3, the length of the magnet 25 in the X-axis direction is shorter than the length of the magnetic guide plate 12 in the X-axis direction. In addition, the length of the magnetic guide plate 12 may be sufficiently long to allow the magnet 25 to be disposed in the upper part of the magnetic guide plate 12, in the range where the first sliding member 20 moves in the X-axis direction. Due to magnetic attraction force between the magnet 25 and the magnetic guide plate 12, the first sliding member 20 and the second sliding member 30 can be coupled to the base plate 10. Therefore, the first sliding member 20 and the second sliding member 30 can be prevented from being separated from the base plate 10 in the Z-axis direction, for example in the case of an external impact or vibrations.

Figure 2:
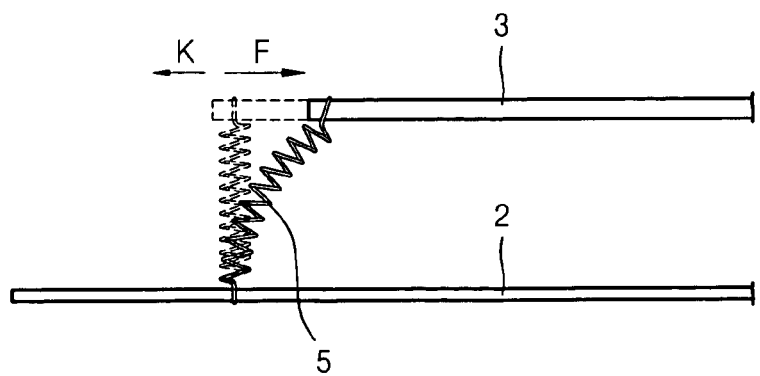
FIG. 2 is a diagram schematically illustrating that a spring mounted between a base plate and a slider in the conventional hand-shake correction system of FIG. 1.
Figure 5:
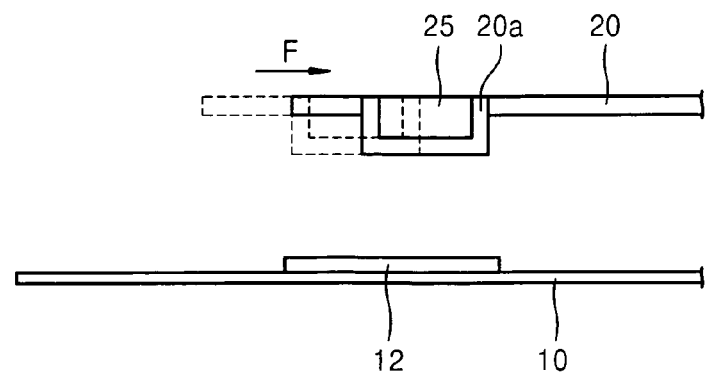
FIG. 5 is a diagram schematically illustrating operation of a pressing means of the hand-shake correction module of FIGS. 3 and 4.

FIG. 5 is a diagram schematically illustrating that a driving load due to the pressing means is substantially insignificant when the first sliding member 20 of the hand-shake correction module of FIG. 3 moves in the X-axis direction. Referring to FIG. 5, although the magnetic attraction force between the magnet 25 and the magnetic guide plate 12 acts vertically and the first sliding member 20 moves in the X-axis direction with respect to the base plate 10, the magnet 25 is substantially always disposed above the magnetic guide plate 12. Therefore, when the first sliding member 20 moves in the X-axis direction with respect to the base plate 10 according to a driving force F from the first driving means 23, an opposing load in the X-axis direction hardly occurs in the present hand-shake correction module 100 compared to the case of the conventional hand-shake correction module of FIG. 2. Accordingly, a thorough motion control of the image pickup device 41 (FIG. 3) is possible and an operational reliability can be also improved.

Figure 1:
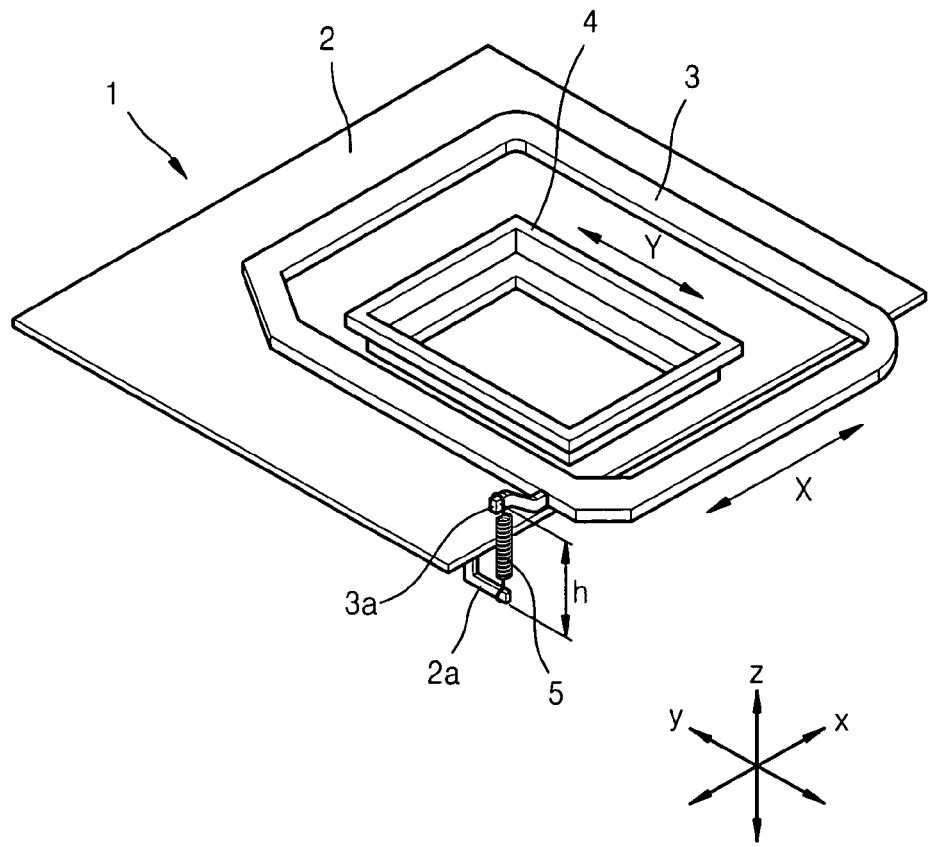
FIG. 1 is a perspective view schematically illustrating a conventional hand-shake correction system.

In addition, when the magnet 25 and the magnetic guide plate 12 are fixed to the first sliding member 20 and the base plate 10, respectively, installation of other elements is not limited in the hand-shake correction module according to an embodiment of the present invention as compared to the case of the conventional hand-shake correction module 1 illustrated in FIG. 1. Furthermore, as can be appreciated from FIG. 6, the space within camera housing 90 is conserved for placing other elements due to the relatively compact configuration of the hand-shake correction module 100.

As another example of the pressing means of the present invention, the magnet 25 may be coupled to the portion 10a of the base plate 10 whereas the magnetic guide plate 12 may be coupled to the portion 20a of the first sliding member 20. In this case, the first sliding member 20 may be a formed of a non-magnetic, paramagnetic (e.g., aluminum) or non-magnetizable (e.g., plastic) material. As described above, the magnet 25 and the magnetic guide plate 12 are disposed facing each other. The length of the magnetic guide plate 12 in the X-axis direction may be longer than the length of the magnet 25. As can be appreciated, in this example the magnet 25 and magnetic guide plate 12 are configured oppositely from the illustrated hand-shake correction module 100 of FIG. 3.

As another example of the pressing means of the present invention, a first member of the pressing means may be the magnet 25 that may be coupled to the first sliding member portion 20a and the second member of the pressing means may be a magnet, magnetic or magnetized guide plate 12 (i.e., the plate 12 may be made of a magnet-type material substantially similar to the magnet 25) that may be coupled to the base plate 10a. In this example, it should be appreciated that the facing surfaces of the first magnet 25 and the second magnet 12 should have opposite polarities such that they attract each other. For example, the first magnet 25 may be configured such that its lower surface defines a South pole, whereas the second magnet 12 is configured such that its upper surface defines a North pole. Alternatively, the first magnet 25 may be configured such that its lower surface defines a North pole, whereas the second magnet 12 is configured such that its upper surface defines a South pole.

A shift sensing means is provided on the right side of the base plate 10 and is configured to sense a moving distance by which the second sliding member 30 (and image pickup device 41) moves in the X-axis and Y-axis directions with respect to the base plate 10. As an example of the shift sensing means, a hall sensor 62 may be used in cooperation with a magnet 63. As is known in the art, the hall sensor 62 operates based on the principle that a current (or voltage) amplitude that is output from the hall sensor 62 is changed according to a strength of a magnetic field to which the hall sensor 62 is subjected or otherwise disposed in.

As illustrated in FIG. 3, the magnet 63 is disposed above the hall sensor 62. The magnet 63 is coupled with the second sliding member 30. When the second sliding member 30 moves in the X-axis and Y-axis directions with respect to the base plate 10, the magnet 63 also moves. Therefore, a position of the magnet 63 with respect to the hall sensor 62 varies according to a movement of the image pickup device 41 in the X-axis and Y-axis directions with respect to the base plate 10 during hand-shake correction. In this way, since the strength of magnetic field changes and the change in current (or voltage) amplitude output from the hall sensor 62 may be sensed, determined or otherwise detected, for example by a controller (not shown) in communication with the hall sensor 62, the shift sensing means thus facilitates sensing of a moving distance by which the image pickup device 41 moves in the X-axis and Y-axis directions with respect to the base plate 10. The measured data can be used as a feedback signal to control the first and second driving means 23 and 33.

Figure 6:
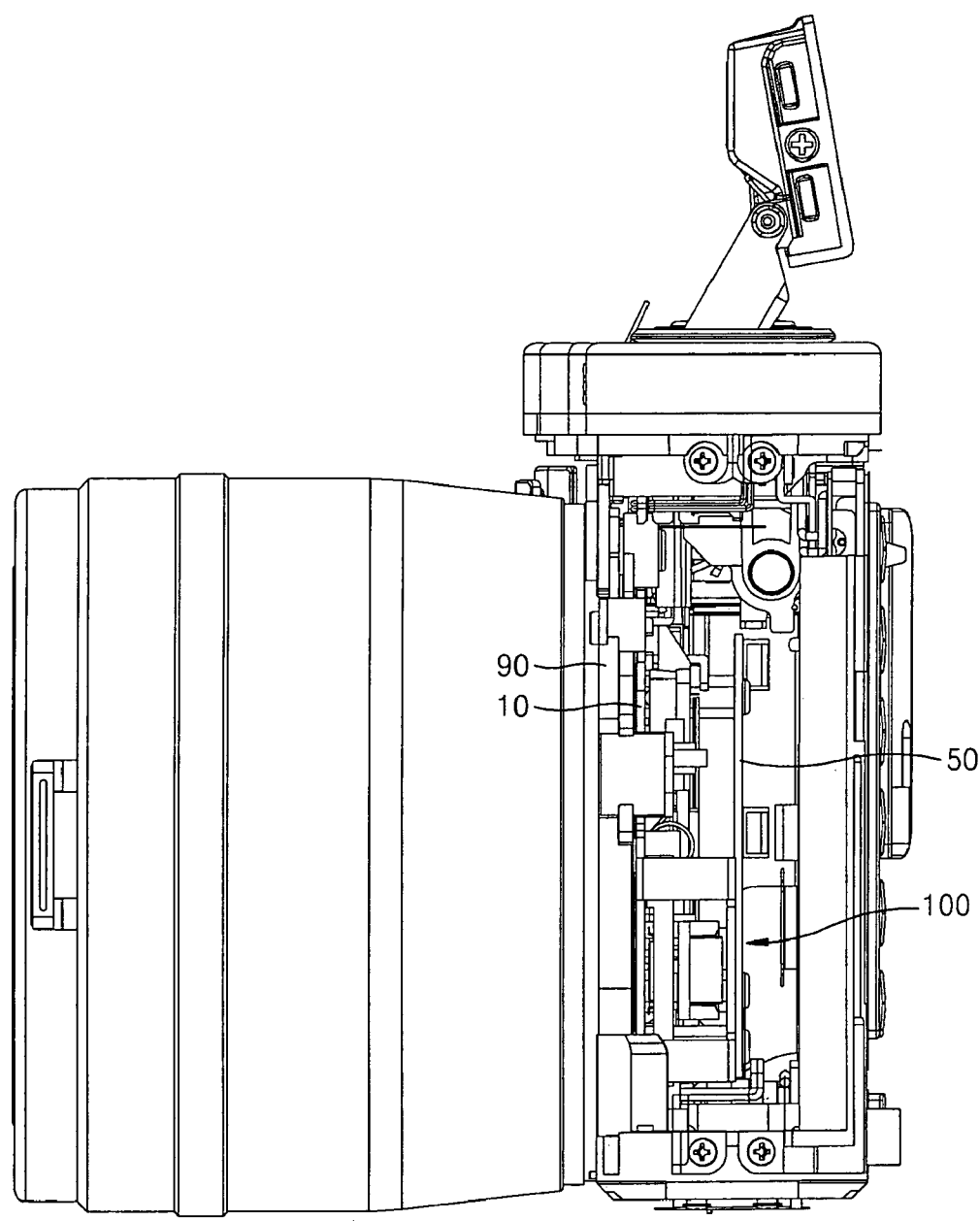
FIG. 6 is a side cut-away view of an example digital camera partially showing internal components including the hand-shake correction module of FIGS. 3 and 4.

Referring now to FIG. 6, an example digital camera is provided that includes the hand-shake correction module 100. As illustrated in FIG. 6, the base plate 10 of the hand-shake correction module 100 may be fixed to a portion of the body or housing 90 of the digital camera. Thus, when the digital camera moves due to hand shake, the base plate 10 also moves relative to the first and second sliding members 20, 30, the circuit board 50 and the image pickup device 40 (FIGS. 3 and 4). On the other hand, hand-shake sensing means (not shown), for example, gyro sensors, accelerometers and the like are installed in the digital camera to detect the amount of motion of the body or housing 90 of the digital camera (or the base plate 10), for example, the rotation amount in the yaw and pitch directions.

A device, for example a processor or controller (not shown) of the digital camera, using measured data from one or more of the hand-shake sensing means (not shown) and the shift sensing means may calculate the amount of movement in the X-axis and Y-axis directions of the second sliding member 30 to compensate for the hand shake of the digital camera. Then, the first driving means 23 and the second driving means 33 drive the first sliding member 20 and the second sliding member 30, respectively, and the second sliding member 30 is moved in the X-axis and Y-axis directions. Here, since the foregoing described and illustrated pressing means is used, driving control of the first driving means 23 is precise and thus, an operational reliability is improved. Therefore, the image pickup device 41 moves in the opposite direction of the hand shake so that clear images can be photographed.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A hand-shake correction module for a camera, comprising:

a base plate;

a first sliding member that is movable in a first axis direction with respect to the base plate;

a second sliding member that is movable in a second axis direction with respect to the base plate, the second axis direction being generally perpendicular to the first axis direction;

an image pickup device coupled with one of the first sliding member and the second sliding member for movement in the first and second axis directions; and a means for generating a magnetic force that presses the first and second sliding members toward the base plate to prevent the first and second sliding members from being separated from the base plate in a third axis direction that is generally perpendicular to the first and second axis directions.

2. The hand-shake correction module of claim 1 wherein the means for generating a magnetic force comprises:

a first magnetic or magnetizable member coupled to at least one of the first sliding member and the second sliding member; and a second magnetic or magnetizable member coupled to the base plate.

3. The hand-shake correction module of claim 2 wherein the first magnetic or magnetizable member is a permanent magnet.

4. The hand-shake correction module of claim 3 wherein the second magnetic or magnetizable member is a second permanent magnet configured to have a polarity opposite the first permanent magnet.

5. The hand-shake correction module of claim 3 wherein the second magnetic or magnetizable member is a metal plate.

6. The hand-shake correction module of claim 5 wherein the base plate comprises a material selected from the group consisting of paramagnetic materials and nonmagnetic materials.

7. The hand-shake correction module of claim 2 wherein a length of the second magnetic or magnetizable member along the first axis direction is greater than a length of the first magnetic or magnetizable member along the first axis direction.

8. The hand-shake correction module of claim 2 wherein the second magnetic or magnetizable member is a permanent magnet.

9. The hand-shake correction module of claim 8 wherein the base plate comprises a material selected from the group consisting of paramagnetic materials and nonmagnetic materials.

10. The hand-shake correction module of claim 8 wherein the first magnetic or magnetizable member is a metal plate.

11. The hand-shake correction module of claim 1 further comprising:

a first driving means coupled with one of the first and second sliding members, the first driving means configured to move said one of the first and second sliding members in one of the first and second axis directions; and a second driving means coupled with the other one of the first and second sliding members, the second driving means configured to move said other one of the first and second sliding members in the other one of the first and second axis directions.

12. The hand-shake correction module of claim 11 wherein at least one of the first and second driving means is a piezo electric motor.

13. The hand-shake correction module of claim 1 further comprising a shift sensing means that senses an amount of movement of the image pickup device along the first and second axis directions with respect to the base plate.

14. The hand-shake correction module of claim 13 wherein the shift sensing means comprises:

a hall sensor coupled to the base plate; and a magnet coupled to one of the first and second sliding members.

15. A hand-shake correction module for a camera, the hand-shake correction module comprising:

a base plate including a first magnetic or magnetizable member;

a first sliding member movably coupled with the base plate for movement in a first axis direction; and a second sliding member including a second magnetic or magnetizable member, the second sliding member being movably coupled with the first sliding member for movement in a second axis direction that is generally perpendicular to the first axis direction, wherein the first and second magnetic or magnetizable members cooperate to prevent the first and second sliding members from being separated from the base plate in a third axis direction that is generally perpendicular to the first and second axis directions.

16. The hand-shake correction module of claim 15 further comprising:

a first driving means coupled with one of the first and second sliding members, the first driving means configured to move said one of the first and second sliding members in one of the first and second axis directions; and a second driving means coupled with the other one of the first and second sliding members, the second driving means configured to move said other one of the first and second sliding members in the other one of the first and second axis directions.

17. The hand-shake correction module of claim 16 wherein at least one of the first and second driving means is a piezo electric motor.

18. The hand-shake correction module of claim 15 further comprising a shift sensing means that senses an amount of movement of the image pickup device along the first and second axis directions with respect to the base plate.

19. The hand-shake correction module of claim 18 wherein the shift sensing means comprises:

a hall sensor coupled to the base plate; and a magnet coupled to one of the first and second sliding members.

20. A camera comprising:

a housing;

a base plate coupled to the housing, the base plate including a first magnetic or magnetizable member;

a first sliding member movably coupled with the base plate for movement in a first axis direction; and a second sliding member including a second magnetic or magnetizable member, the second sliding member being movably coupled with the first sliding member for movement in a second axis direction that is generally perpendicular to the first axis direction, wherein the first and second magnetic or magnetizable members cooperate to prevent the first and second sliding members from being separated from the base plate in a third axis direction that is generally perpendicular to the first and second axis directions.

* * * * *